F. D. Boyle,
Steam-Boiler Water-Feeder,
Nº 39,378.   Patented Aug. 4, 1863.
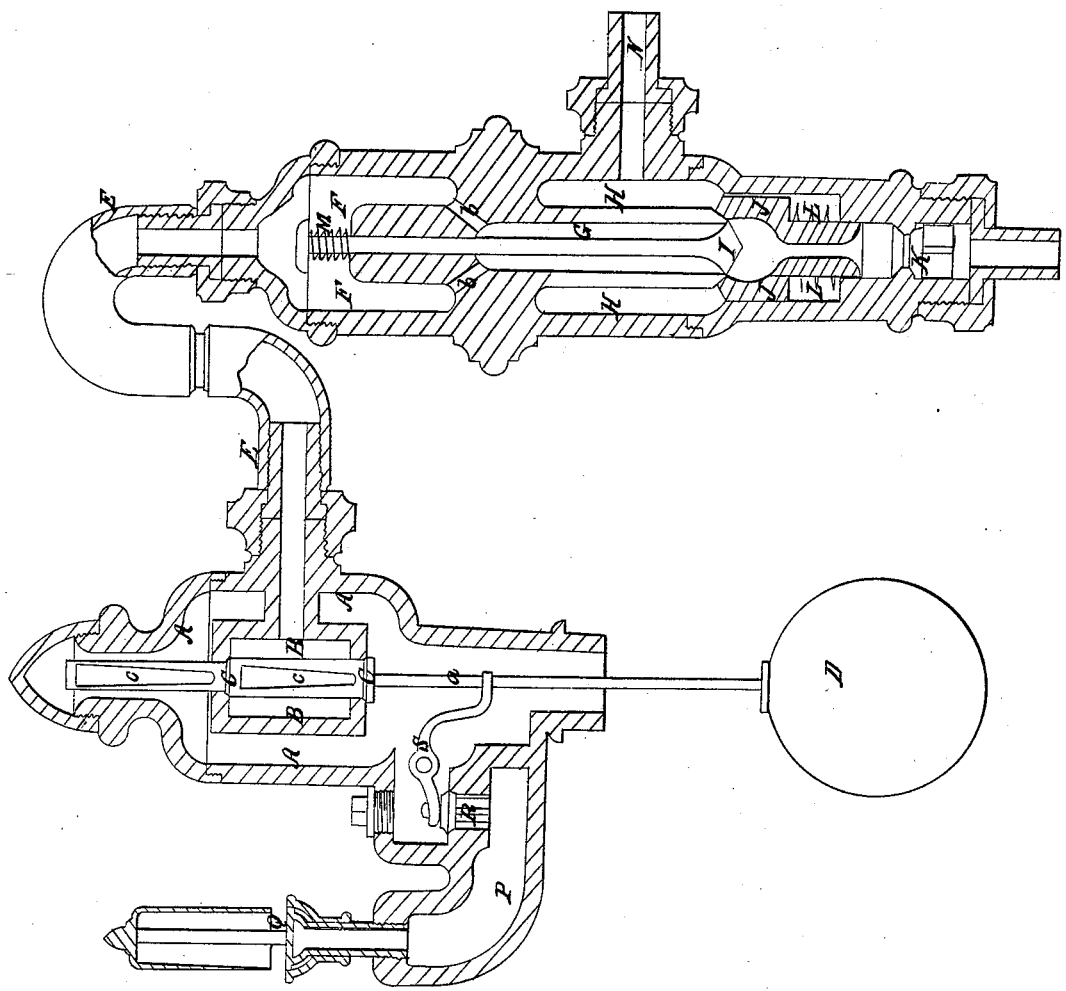
Witnesses.
J. W. Coombs
G. W. Reed
Inventor
F. D. Boyle
per Munn & Co.
Attorneys

UNITED STATES PATENT OFFICE.

FRANKLIN D. BOYLE, OF EVANSVILLE, INDIANA.

IMPROVEMENT IN SELF-ACTING BOILER-FEEDERS.

Specification forming part of Letters Patent No. 39,378, dated August 4, 1863.

*To all whom it may concern:*

Be it known that I, FRANKLIN D. BOYLE, of Evansville, in the county of Vanderburgh and State of Indiana, have invented a new and Improved Self-Regulating Apparatus for Feeding Steam-Boilers; and I do hereby declare that the following is a full, clear, and exact description of the same, reference being had to the accompanying drawing, forming part of this specification, said drawing representing a central vertical section of the apparatus.

This invention consists in a certain novel system of valves, chambers, and passages, the whole governed by a float connected with one of the valves, for the purpose of effecting a properly-regulated supply of water to a steam-boiler.

To enable others skilled in the art to make and use my invention, I will proceed to describe its construction and operation.

A is an upright chamber intended to be secured at its bottom to the top or upper part of a steam-boiler in such manner that it always has free communication with the steam-space of the boiler. B is a smaller chamber, arranged within the chamber A, but having no communication therewith except through a valve, C, which opens downward, and which is connected by a rod, *a*, with a float, D, which rests on the water in the boiler. This valve is kept closed by the buoyancy of the float while the water in the boiler is at a proper level, but when the water begins to get too low the float descends and opens the valve, admitting steam to the chamber B. This chamber B is connected by a pipe, E, with a chamber, F, which communicates at all times by passages *b b* with a chamber, G, arranged below it. This latter chamber is surrounded by an annular chamber, H, with which is connected the water-supply pipe N, the end of which enters a reservoir, well, or other place whence the water is to be obtained for the supply of the boiler. The chamber G is fitted at its bottom with a valve, I, and the chamber H fitted at its bottom with a valve, J, both of which valves open downward. The valve J is hollow, that there may be communication through it from the chamber G to the check-valve K, which is arranged at the connection of the apparatus with the water space of the boiler, and it has a spiral spring L, applied around its stem to close it. The valve I has a long stem, which passes right through the chamber G and into the chamber F above, where a spiral spring, M, is applied around its stem to close it. On the opening of the valve C, when the water begins to get below the desired level, as above described, and the consequent admission of steam to the chamber B, the steam flows from the chamber B through the pipe E into the chamber F, and thence through the openings *b b* into the chamber G, forcing open the valve I, and thereby reaching the valve J, which it also forces down, thereby opening and entering the chamber H. That which enters the chamber H is condensed and a vacuum is thereby formed in the said chamber, into which the water rushes through the pipe N, and this water, descending in the said chamber H, is met by the steam from the chamber I, and thereby forced by the check-valve into the boiler. This operation continues until the water has risen to such a height in the boiler that the float closes the valve C and shuts off the steam from the chamber B, when the valves I and J are closed by their respective springs, and the operation of the apparatus stops until the water again gets below the lowest desired level, when the valve C opens, and the operation again proceeds. The steam-passages *c c* in the stem of the valve C are graduated or tapered, so that the lower the level of the water is the larger will be the area of the opening of the passages, and as the water rises the steam-passages will be contracted and the feeding operation will become slower. From one side of the chamber A there branches off a pipe, P, to which is attached a whistle, Q, and at the connection of the pipe P with the chamber A there is a valve, R, which closes by the pressure of steam. This valve has applied in connection with it a lever, S, so arranged that in case from any accidental failure of the feeding apparatus to work, or from the water in the reservoir having been all used, the water in the boiler gets dangerously low, the valve will strike upon the said lever and cause the said valve R to be opened by the weight of the float, thereby admitting steam to the whistle and producing an alarm.

What I claim as my invention, and desire to secure by Letters Patent, is—

The combination of the chambers A B, valve C, float D, pipe or passage E, chambers F G H, valves I J, and pipe N, the whole arranged to operate substantially as and for the purpose herein specified.

FRANKLIN D. BOYLE.

Witnesses:
 J. W. GLEICHMAN,
 RICHARD WILSON.